United States Patent [19]

Danstrom

[11] Patent Number: 4,582,963
[45] Date of Patent: Apr. 15, 1986

[54] ECHO CANCELLING USING ADAPTIVE BULK DELAY AND FILTER

[75] Inventor: Richard J. Danstrom, Lisle, Ill.

[73] Assignee: Rockwell International Corporation, El Segundo, Calif.

[21] Appl. No.: 403,224

[22] Filed: Jul. 29, 1982

[51] Int. Cl.[4] .............................................. H04B 3/20
[52] U.S. Cl. .................................. 179/170.2; 179/170.6
[58] Field of Search ............... 179/170.2, 170.6, 170.8; 370/32; 364/200, 900

[56] References Cited

U.S. PATENT DOCUMENTS

| | | | |
|---|---|---|---|
| 3,535,473 | 10/1970 | Flanagan et al. | 179/170.2 |
| 3,721,777 | 3/1973 | Thomas | 179/170.2 |
| 4,024,357 | 5/1977 | Sourgens et al. | 179/170.2 |
| 4,464,545 | 8/1984 | Werner | 179/170.2 |

OTHER PUBLICATIONS

Preliminary Spec. Sheet for S2816, American Microsystems Inc., Jul. 1981.

Primary Examiner—Gene Z. Rubinson
Assistant Examiner—R. Vaas
Attorney, Agent, or Firm—V. Lawrence Sewell; H. Fredrick Hamann

[57] ABSTRACT

Telephone circuit echo cancelling is disclosed of the type employing a digital transversal filter which adapts to incorporate the impulse response of the echo producing system in such a way as to cancel the echo. Such impulse responses often include large initial periods of substantially zero response due to transmission delays; the echo cancelling of the invention does not attempt to provide filter coefficients and delays for this initial period. Instead, a bulk delay memory holds signal samples for this initial period and then provides them to the transversal filter input. A method is disclosed for automatically selecting the value of the bulk delay based on input and output signals of the system.

16 Claims, 2 Drawing Figures

ECHO CANCELLING USING ADAPTIVE BULK DELAY AND FILTER

BACKGROUND OF THE INVENTION

This invention relates to a telephone circuit echo canceller of the type employing a digital transversal filter which adapts to cancel the echo.

A telephone circuit echo canceller using an adaptive filter can effectively cancel the echo introduced by a hybrid. In doing so, the filter adapts to include the impulse response of the echo producing system. This includes any transmission delay from the canceller to the hybrid and back, during which period the impulse response is approximately zero. If transversal filter delays and coefficients are provided to incorporate the entire impulse response, a very large portion of the filter is occupied, inefficiently, with providing nothing more than a fixed delay.

SUMMARY OF THE INVENTION

In accordance with the present invention, the fixed or bulk delay necessary for echo cancelling is provided separate from the adaptive filter delays and coefficients. A method is included for automatically selecting the value of bulk delay suitable for the system in which the canceller is used.

DESCRIPTION OF PREFERRED EMBODIMENTS

Figure 1:
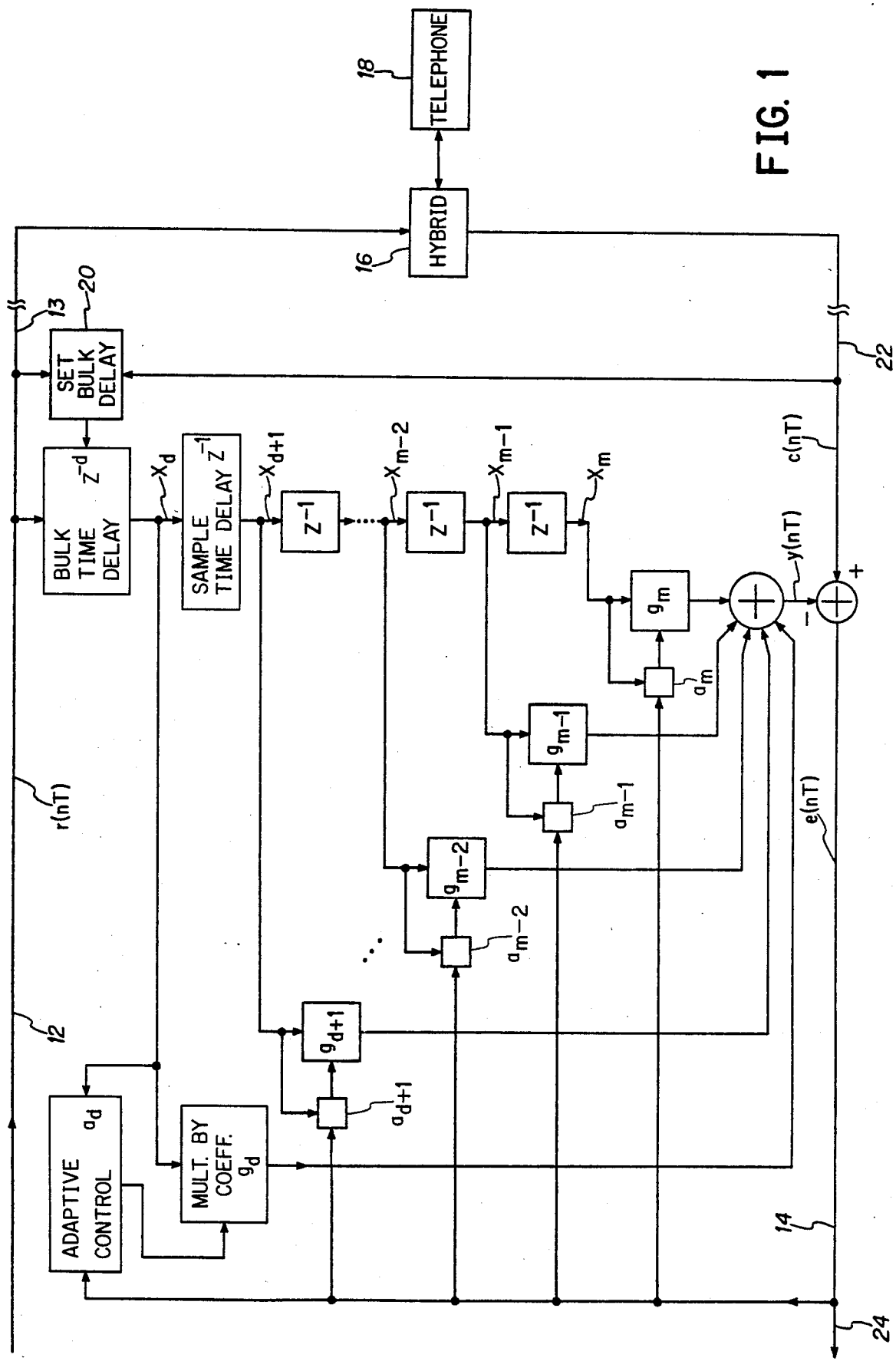
FIG. 1 is a block diagram of the filtering function of an echo canceller in accordance with the invention.

FIG. 1 shows an echo canceller in accordance with the invention, located at one end of a long distance telephone circuit. The telephone circuit includes a receive line 12, a transmit line 14 and a hybrid 16 connecting the transmit and receive line to a telephone 18. The echo canceller of the invention includes a transversal filter, which in a preferred embodiment is digital. It has a number of individual sample delays $z^{-1}$ and a bulk delay $z^{-d}$. Delayed signal samples are combined with weights $g_k$. The filter output $y(nT)$ is subtracted from the signal on the transmit line $c(nT)$, providing an error signal $e(nT)$.

The weights $g_k$ of the transversal filter are adapted in response to the error signal $e(nT)$ to provide an impulse response approximating the echo characteristics of hybrid 16. As a result, a signal $r(nT)$ arriving on receive line 12 gives rise to an echo in a signal $c(nT)$ from hybrid 16, and generates an approximation of this echo in the signal $y(nT)$ from the transversal filter. When $y(nT)$ is subtracted from $c(nT)$, the echo is substantially cancelled in the resulting error signal $e(nT)$.

The adaptation of the transversal filter is indicated in the figure by the functions of adaptive elements such as $a_d$. These elements can be embodied as conventional adaptation algorithms. For example, the two following algorithms are suitable:

$$g_k((n+1)T)=g_k(nT)+K^*e(nT)^*x_k(nT)$$

$$g_k((n+1)T)=g_k(nT)+K^*sgn(e(nT))^*x_k(nT)$$

In accordance with the present invention, methods have been conceived for setting the bulk delay d, as indicated by functional element 20. The bulk delay setting element 20 is shown receiving the signal $r(nT)$ on the receive line 12 and the signal $c(nT)$ on the transmit line 14. In some of the embodiments of setting the bulk delay, other variables become important as well.

Figure 2:
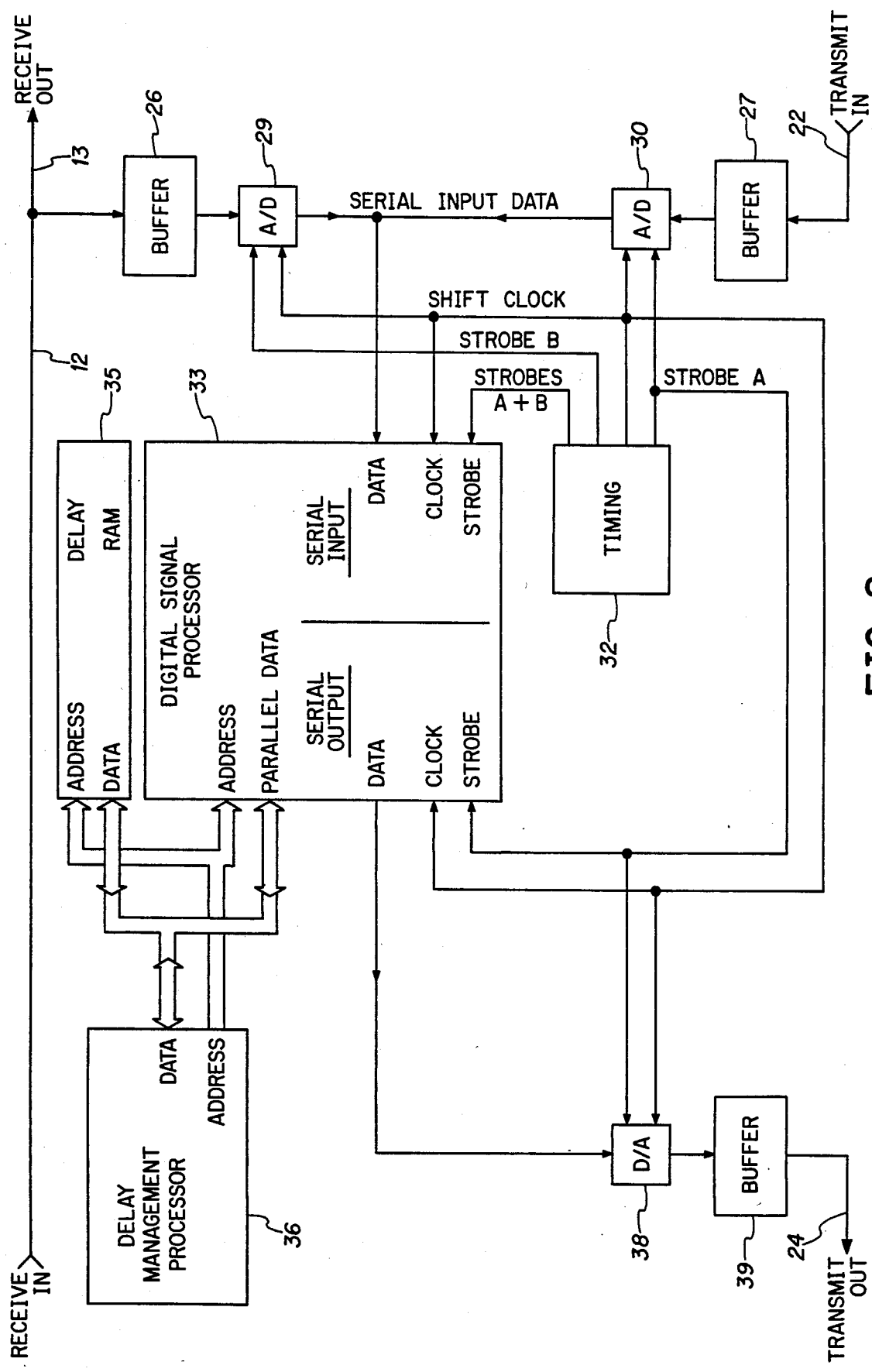
FIG. 2 is a block diagram of apparatus for implementing the echo canceller of FIG. 1.

FIG. 2 shows a hardware system for implementing the echo canceller according to the invention. The labeling of the receive input and receive output with reference numerals 12 and 13 respectively corresponds to numbering on the more functional diagram of FIG. 1. Similarly, TRANSMIT IN 22 and TRANSMIT OUT 24 correspond to like numbered inputs and outputs of FIG. 1.

The two signal inputs to the echo canceller are brought through analog buffers 26 and 27 and sampled by analog-to-digital converters 29 and 30. Under the control of timing circuit 32, samples from analog-to-digital converters 29 and 30 are brought into a digital signal processor 33 at its serial data input. Processor 33 is preferably a programmable digital signal processor such as a Model 7720 by Nippon Electric Company. The digital signal processor 33, which has its own memory, can be used to implement the transversal filter illustrated in FIG. 1, including the determination of the value of the bulk delay required.

An implementation of the bulk delay is delay RAM 35, which can be for example a 2K×8 static RAM. Here the receive signal sample values from analog-to-digital converter 29 are stored for the duration of the bulk delay time.

Both delay RAM 35 and digital signal processor 33 are controlled as peripherals by delay management processor 36. Processor 36 can be for example an Intel Model 8051, which is a single chip microprocessor having its own program store. Management processor 36 carries out the tasks of reading signal samples at the parallel data port of digital signal processor 33 and storing the samples in delay RAM 35. When digital signal processor 33 has completed its computation of the bulk delay value, the value is transmitted to delay management processor 36. Then, when a sample stored in delay RAM 35 has been there for the duration of the bulk delay time, delay management processor 36 transfers it back to digital signal processor 33.

Digital signal processor 33, as described above, can compute the output $y(nT)$ of the transversal filter and subtract it from $c(nT)$, which is made up of transmit input samples from analog-to-digital converter 30. The digital output $e(nT)$ is provided at the serial data output of processor 33. This is converted to analog form by digital-to-analog converter 38 and passed through analog buffer 39 to the TRANSMIT OUT 24.

FILTER ADAPTATION AND BULK DELAY SELECTION

The adaptation of the transversal filter, that is, the process of adaptively setting the values of the filter weights, is largely conventional. However, in accordance with the present invention, it is necessary to carry out a novel process of determining the bulk delay "d". Two preferred methods of determining the bulk delay will be described. In one, the bulk delay is determined first, then the remaining filter weights are adaptively selected. In the other method, the entire filter including the bulk delay is adapted using a suitable algorithm.

An algorithm for separately selecting the bulk delay value is shown in Table 1. The algorithm is shown in the form of a high level computer programming language. It is expected that a processor such as digital signal processor 33 would be programmed in an assembly level language; the listing at Table 1 is for clarity of illustration.

TABLE 1

BULK DELAY SELECTION ALGORITHM
DAA ( r(nT), c(nT), D )

| | |
|---|---|
| BEGIN | if RTO and $|c(nT)| >$ TH3 then |
| | RTO = false |
| | Call EVAD(NDC,D) |
| | NDC = 0 |
| | GOTO EVAR |
| NDCAC | if RTO and $|c(nT)| < =$ TH3 then |
| | NDC=NDC+1 |
| EVAR | if $|r(nT)| >$ TH2 and QC $>$ DMAX then |
| | RTO=true |
| | GOTO END |
| QCAC | if $|r(nT)| <$ TH1 then |
| | QC=QC+1 |
| | GOTO END |
| | QC=0 |
| END | Return |
| SUBROUTINE | EVAD(NDC,D) |
| BEGIN | for i=n to 1 step −1 |
| | DC(i)=DC(i−1) |
| | next i |
| | DC(O)=NDC |
| | for i=0 to n |
| | MD=0 |
| | for j≠0 to n |
| | MD=MD+1/1(+|DC(i)−DC(j)|) |
| | next j |
| | if MD $>$ MDMAX then |
| | MDMAX=MD |
| | D=DC(i) |
| | next i |
| | D=D−5 |
| END | Return |

The concept implemented by the algorithm of Table 1 is to detect any substantial signal value occurring on the receive line 12 after a quiet period and detecting how long it takes the echo of this signal to occur on the transmit input line 22.

The DAA algorithm is called once each sample period. At first, the "if" conditions will not be met, except perhaps for the one labeled QCAC. This determines whether the input r(nT) is smaller in magnitude than a threshold value TH1, thus qualifying as a quiet sample. If so, a count QC of the number of quiet sample intervals is incremented. If not, then the count QC is set to zero, making QC a measure of consecutive quiet intervals.

When the count QC is greater than a value DMAX, than the condition at entry point EVAR is partially fulfilled. DMAX is made to be at least as great as the maximum value possible for the bulk delay. This is intended to assure that the first substantial value of c(nT) detected at TRANSMIT input 22 after the occurrence of the input at r(nT) will be an echo corresponding to the input of r(nT).

If a value of r(nT) exceeding a threshold TH2 occurs when QC is greater than DMAX, then the condition at entry point EVAR is fulfilled and the flag RTO is set. After this flag is set, and before a substantial echo response is detected in the signal c(nT), the condition labeled NDCAC is fulfilled. During this period, the variable NDC is incremented, building a count of the number of sample periods in the bulk delay.

When the substantial echo response is detected, as indicated by the magnitude of c(nT) exceeding a threshold TH3, then control passes to a delay evaluation routine EVAD. In attempting to identify the echo in c(nT) corresponding to the detected substantial value of r(nT), system noise can give rise to varying values of bulk delay. The bulk delay value candidates due to noise will be randomly distributed, while the candidates due to the detected value of r(nT) will be clustered together. Therefore, in a preferred embodiment, the clustering of a number of delay value candidates is examined in the routine EVAD to determine the best estimate of the bulk delay.

The routine EVAD is called each time a new delay value candidate NDC is generated. In this routine, DC(i) is an nx1 array of possible delay value candidates received from the calling routine. It is not shown in the routine how n, the number of delay candidates in the array, is set. This will be a function of how noisy the system is. For a more noisy system, more delay value candidates must be saved in order to obtain a good estimate of the bulk delay.

The first step in the delay evaluation routine is to enter the new delay value candidate NDC in the array DC. Then each value in the array DC has calculated for it a figure of merit MD. MD is calculated by the formula shown, which gives the greatest merit to a delay candidate which is very similar in delay value to all the other candidates. After calculating the figure of merit MD for all the candidates, the best delay candidate is selected as the estimate of the delay D. Optionally, as shown in the last step of the routine, several sample intervals, for example five, can be subtracted from the selected bulk delay value as a margin of error. When the delay is thus modified, the first several intervals of the adapted transversal filter may have zero weights associated with them.

Once the bulk delay is determined by the algorithm of Table 1, the remainder of the transversal filter shown in FIG. 1 is adapted according to conventional techniques.

The method described with reference to Table 1 can be summarized as follows. There is detected a condition when the receive signal r(nT) includes a relatively large signal value, with respect to a reference, threshold TH2, preceded for a substantial time (the count QC of samples) by a relatively small signal value (the quiet samples), with respect to a reference TH1. As particularly described, the substantial time (QC samples) must be greater than a maximum possible practical value DMAX for the selected amount of time delay D. Then, the adaptive process detects when the signal c(nT) on the transmit line includes an echo response, a relatively large value with respect to a reference threshold TH3, at a time (NDC number of samples) elapsed from the occurrence of the detected large value of the received signal r(nT). The value NDC of elapsed time is used as an estimate of the selected amount D of time delay for the bulk delay. To provide an improvement in the presence of noise, subroutine EVAD repeatedly uses the value of elapsed time NDC to obtain a plurality of estimates DC(i) of the selected amount of time delay D. In the specific example, described, the selected amount of time delay D is identified from the estimates DC(i) by detecting one of the estimates which is most closely clustered with the others of the estimates, as described above.

In the second method of bulk delay determination, the system begins with zero bulk delay and embarks upon an iterative process of adapting the coefficients of the transversal filter and incrementing the bulk delay. This process is continued, until the proper value of bulk delay is found.

In the determination of the appropriate bulk delay, the bulk delay is varied, the transversal filter is adapted, and there is computed a measure of the degree of adaptation of the combination of the bulk delay and transversal filter. Then, the trial bulk delay giving the maximum measure of such adaptation can be selected as an appropriate bulk delay value. To understand some of the measures of adaptation which can be employed, it is helpful to visualize the way in which the transversal filter coefficients change in the process of determining a final value of bulk delay.

When an optimal value of bulk delay is used, and the transversal filter is fully adapted, a plot of its coefficients corresponds to the non-zero impulse response of the echo producing system. The earliest nonzero portions of the impulse response are associated with the earliest part of the transversal filter delay stages. However, while the bulk delay is being determined and when it is less than the optimal value, the coefficients of the filter which have nonzero echo impulse response values are delayed from the input of the filter by a number of sample intervals equal to the difference between the optimum bulk delay and the trial value presently being used. As the process continues and this difference becomes progressively smaller, the coefficient values corresponding to the nonzero portion of the echo impulse response "move" through the transversal filter from its larger delay values toward the zero delay end of the filter.

Taking into account the behavior of the filter coefficients during the determination of the bulk delay, one measure of the adaptation of the filter plus bulk delay is given by $$\sum_{k=0}^{m} |g_k|.$$

The $g_k$ are the coefficients of the transversal filter of FIG. 1, and the sum is taken over the total number of these coefficients. As the trial value of bulk delay more nearly approaches the final selected value, the nonzero portion of the echo system impulse response moves into the coefficient values, displacing zero values. This causes the above sum to grow. It is known that the nonzero part of the echo impulse response is a decaying value, so that for a sufficient number of transversal filter taps, the coefficient values at long delays will be much smaller than those at the short delays. Therefore, if the trial bulk delay is increased beyond the optimum value, the sum of the magnitudes of the filter coefficients will begin to decrease. In this way it is possible to make a good estimate of the optimal bulk delay value. Another similar measure of adaptation used in the same way is $$\sum_{k=0}^{m} g_k^2.$$

Somewhat different are the measures $$\left(\sum_{k=0}^{m/2} |g_k|\right) / \left(\sum_{k=m/2}^{m} |g_k|\right) \text{ and }$$

$$\left(\sum_{k=0}^{m/2} g_k^2\right) / \left(\sum_{k=m/2}^{m} g_k^2\right).$$

In the latter two cases, the numerator sum is computed over the early half of the filter coefficients, while the denominator sum is for the late half. It can be seen that these measures will respond fairly dramatically as the decaying impulse response moves from the late half of the filter into the early half.

An important measure of adaptation based on the filter coefficient values is simply to monitor the magnitude of one of the coefficients in the early part of the filter. By concentrating on one coefficient, the computational time can be reduced. Yet this simple measure can detect when the echo impulse response moves into the early portion of the filter. Use of such a measure is illustrated in the program of Table 2 below.

Another way of computing the degree of adaptation of the filter plus bulk delay is to use the quantity $$\frac{\text{Avg}|r(nT)|}{\text{Avg}|e(nT)|}$$

or the quantity $$\frac{\text{Avg } r(nT)^2}{\text{Avg } e(nT)^2}$$

The better the adaptation, the smaller the error function $e(nT)$ will be in relation to the receive signal $r(nT)$. In addition, it is important that on the average there has been a substantial receive signal $r(nT)$; otherwise, the filter will not have been in a position to carry out adaptation. Since the portion of the filter output $y(nT)$ resulting from a particular $r(nT)$ may be significantly delayed with respect to the $r(nT)$, the period over which the signals and these measures of adaptation must be averaged is long. This in turn means that greater time is required to indicate complete adaptation.

A further set of measures for adaptation are $$\frac{\text{Avg}|y(nT)|}{\text{Avg}|e(nT)|} \text{ and } \frac{\text{Avg } y(nT)^2}{\text{Avg } e(nT)^2}$$

These are similar in properties to the preceding measures, except that there is no delay between the terms in each ratio, so shorter averaging periods can be used.

TABLE 2

BULK DELAY SELECTION BY ADAPTATION

BDEL = 0
COUNT = 50
FNS = 0
FIC = 0
Store Sample, R, of Receive Signal in Bulk Delay Memory at Address PR
Fetch Delayed Receive Sample, RD, from Bulk Delay Memory at Address PRD
Assign Value of RD to Transversal Filter Input X(1)
X(1)=RD
Generate Transversal Filter Response, SE, from Filter Coefficients G and Delayed Inputs X(J)
SE=0
DO 30 J=1,50
SE=SE+G(J)*X(J)
30 CONTINUE
Create Error From Transmit in Signal, XIN
ERR=XIN-SE

TABLE 2-continued
BULK DELAY SELECTION BY ADAPTATION

```
      If Near-End Speech Exists (NSD=1) Skip Adaptation
      IF (NSD.EQ.0) 100,550
      Calculate GSUMA, Measure of Adaptation
100   GSUM=G(10)*G(10)
      CALL LPFILT (GSUM,GSUMD,GSUMA)
      If Bulk Delay has been Selected, Skip to Adaptation of
      Coefficients
      IF (FNS.EQ.0) 120,500
      Compute Measure of Opportunity Which Coefficients have
      had to Adapt
120   BDI=BDI+F*(R*R)
      If Adequate Opportunity to Adapt, Increment Bulk Delay
      IF (BDI.LT.0.5) 500,140
140   BDI=BDI-0.5
      Provide Minimum Period of Adaptation Before Any
      Incrementing of Bulk Delay
      IF (FIC.EQ.0) 160,180
160   COUNT=COUNT-1
      IF (Count.EQ.0) 170,500
170   FIC=1
      GOTO 500
      Save Max. Value (GSUM1) of GSUMA and Corresponding
      Value (BDEL1)
180   IF (GSUMA.GT.GSUM1) 200,220
200   GSUM1=GSUMA
      BDEL1=BDEL
      GOTO 450
      If GSUMA has Decreased to a Fraction of Maximum,
      Select BDEL1 as Bulk Delay Value
220   IF(GSUMA.LT.0.5*GSUM1) 400,450
400   FNS=1
      BDEL=BEDL1
      Zero X and G for Readaptation with Selected Bulk
      Delay Value
      DO 410 J=1,50
      X(J)=0
      G(J)=0
410   CONTINUE
      GOTO 600
      Adapt & Shift Coefficients, Increment Bulk Delay
450   DO 460 J=1,49
      G(J)=G(J)+K*ERR*X(J)
      G(J)=G(J+1)
460   CONTINUE
      BDEL=BDEL+1
      GOTO 600
      Adapt Coefficients, Shift Delayed Inputs (X's)
500   DO 510 J=1,49
      G(50-J)=G(50-J)+K*ERR*X(50-J)
      X(51-J)=X(50-J)
510   CONTINUE
      GOTO 600
      Shift Delayed Inputs (X's)
550   DO 560 J=1,49
      X(51-J)=X(50-J)
560   CONTINUE
      Update Bulk Delay Pointers
600   PR=PR+1
      IF (PR.EQ.1000) PR=1
      PRD=PR-BDEL
      IF (PRD.LE.0) PRD=PRD+1000
      Subroutine LPFILT
      SUBROUTINE LPFILT (AIN,AA,AOUT)
      REAL AIN,AA,AOUT,D1,D2
      COMMON/AVG/D1,D2
      IF (AIN.LT.0) AA=0-AIN
      IF (AIN.GE.0) AA=AIN
      AOUT=0.1*AA+0.9*AOUT
      RETURN
```

Table 2 illustrates program steps suitable for bulk delay selection by adaptation. Table 2 generally uses different names for variables, than the symbols used in FIG. 1 and elsewhere. Comments in the table attempt to clarify the correspondence between the variable names and the variables used elsewhere.

The listing of Table 2 shows the computational part of an adaptation program in FORTRAN, without input/output portions, such as interaction with delay management processor 36. Indeed, at the beginning of the listing, a comment indicates that a sample R of the receive signal (from analog-to-digital converter 29) is sent to delay RAM 35 at an address indicated in Table 2 by the variable PR. Then, a delayed receive signal sample, RD, is fetched from the bulk delay memory at an address PRD. The addresses PR and PRD are updated very near the end of the listing in Table 2, beginning at statement 600. The address of the delayed sample incorporates the current value of the bulk delay BDEL.

The delayed receive sample value RD is assigned to the input X(1) of the transversal filter. The output of the transversal filter is computed in the loop which includes step 30, by multiplying the coefficients G(J) and the delayed variables in the transversal filter X(J). In accordance with FIG. 1, the error signal ERR is the difference between the TRANSMIT IN signal and the output of the transversal filter.

For proper adaptation, it is useful to detect whether there is near end speech, and set a flag NSD=1, if there is. The process of detecting near end speech is not shown in the listing of Table 2. Such processes are conventional, for example, relying on the fact that in the absence of near end speech, the TRANSMIT IN signal should be, at least 6 dB down from the receive input.

Near end speech on the transmit input is uncorrelated with signals on the receive input, and will not provide a basis for adaptation, but will instead tend to change valid coefficient values already obtained. Therefore, when near end speech is detected, adaptation is inhibited and control goes to statement 550, which simply performs the shifting of the X's required to implement the delay line of the transversal filter.

If there is no near end speech, a measure of adaptation GSUMA is computed by first squaring one of the filter coefficients, for example the tenth coefficient as shown. Such a choice of a particular coefficient requires a knowledge that the echo system impulse response has a maximum, recognizable by the criteria of the program, which occurs by the tenth sample. GSUMA is then derived from the square of the tenth coefficient by calling subroutine LPFILT (shown at the end of the listing) to perform a low pass filtering operation on the time variation of GSUM.

It is important before incrementing a trial value of bulk delay to try to ensure that the filter has had adequate opportunity to adapt since the last change in bulk delay. One approach to ensuring this opportunity is as follows. It has been found that for the adaptation algorithm given above, which includes the term $K*e(nT)*x_k(nT)$, the rate of change of adaptation of the filter with respect to time is approximately proportional to $r(nT)^2$. For the algorithm employing $K*sgn(e(nT))*x_k(nT)$, the rate of change of adaptation with respect to time is approximately proportional to $|r(nT)|$. The program of Table 2 uses the former algorithm, for example, in the equation $G(J)=G(J)+K*ERR*X(J)$ following statement 460. Accordingly, the equation at statement 120 represents an integration of the rate of change of filter adaptation, $F*(R*R)$, where F is a constant. Thus the value of the integral BDI is a measure of the opportunity which the filter has had to adapt since the beginning of the period of integration. Until the integral BDI exceeds a selected threshold, no incrementing of the bulk delay is permitted. For this threshold a suitable value is 0.5, and for F, 0.25. These parameters can be varied according to practical considerations including the extent of the noise in the system.

When the integral has not exceeded the threshold, program control branches to statement 500, at which the coefficients are adjusted in keeping with the adaptation algorithm including ERR, and the X's are shifted to implement the filter delay line. When the integral BDI does exceed threshold, it is reset by the amount of the threshold at statementt 140.

The statements following 140 involving the flag FIC and the accumulation COUNT ensure a minimum number of iterations through the adaptation steps at statement 500, before incrementing the bulk delay beyond zero. This is important should the optimal bulk delay prove to be near zero. If, for example, COUNT is initialized at 50, then 50 repetitions are assured before incrementing the bulk delay.

The statements following statement 180 save the maximum detected value GSUM1 of the measure of adaptation GSUMA of the filter plus bulk delay, along with the value BDEL1 of bulk delay giving rise to the maximum. At statement 220, there is dealt with the problem of determining when the measure of adaptation GSUMA has been maximized, so as to permit a final selection of bulk delay. The criterion employed there is to decide that a suitable maximum of GSUMA has been passed when GSUMA decreases to a fraction, say half, of that maximum. The particular fraction chosen and the sample used in the computation of GSUM at statement 100 are interdependent, incorporating some knowledge or assumption about the form of the echo impulse response. For example, if the nonzero part of the echo impulse response is known to be a decaying sinusoid which reaches its maximum before the tenth sample, then the parameters shown in the listing are quite effective.

In the period before it is determined that a true maximum of GSUMA has been detected, the branch from statement 220 is to statement 450. There, the adaptation algorithm incorporating a multiplication by ERR is applied to the coefficients. Further, instead of shifting the inputs X(J), the coefficients G(J) are shifted. This is in keeping with the incrementing of the bulk delay BDEL and minimizes adaptation required in the next iteration.

When the decision at statement 220 indicates that a true maximum of GSUMA has been located and a value of bulk delay is selected, then BDEL is set at the bulky delay value corresponding to the maximum of GSUMA. Further, the X's and G's are set to zero, so that the filter can be readapted using the selected value of bulk delay, rather than the trial value in use when GSUMA became less than a fraction of the maximum.

The second method of bulk delay determination can be summarized as follows. The delayed received signal $x_d$ (RD in Table 2) is filtered adaptively by a transversal filter having a plurality of delay taps, each having a coefficient $g_k$ (G(J) in Table 2). The bulk delay is controlled to provide various values (BDEL in Table 2) of time delay. An estimate BDI of the opportunity of the transversal filter to adapt after the provision of a new one of the various values BDEL of time delay is computed as described above. This estimate BDI of the opportunity is required to exceed an adequate threshold as described above, before still newer values of time delay BDEL are provided. A measure of adaptation for the combination of the bulk delay and the transversal filter is generated for each value of the time delay BDEL. Various acceptable formulas for this measure are given above, and the measure is represented in the program of Table 2 by the variable GSUMA. The formulas for such a measure of adaptation listed above include at least one of said coefficients $g_k$. As described above, the process of determining the selected amount of time delay BDEL1 to be provided by the bulk delay includes assessing change among the coefficients $g_k$ or G(J) in response to the various trial values BDEL of time delay. As also described above, the determination of the selected amount of time delay BDEL1 includes detecting from the measure of adaptation (for example GSUMA) when a set of the various values BDEL of delay are near an optimal value. In the process described in connection with Table 2, there is generated the adaptation measure GSUMA which reaches a maximum value GSUM1 for values BDEL of time delay near the optimal amount of time delay.

The steps of Tables 1 and 2 disclose methods for programming the apparatus of FIG. 2 to provide means for automatically selecting a suitable value of bulk delay for use with the adaptive transversal filter. In the resulting echo canceller, the use of the bulk delay considerably reduces the number of delays and coefficients in the filter and the amount of memory required therefor.

I claim:

1. A method of echo cancelling of the type which operates between a receive line and a transmit line at a near end of a long distance telephone circuit to process a signal received on the receive line in order to cancel an echo in a signal on the transmit line, comprising:

subjecting the received signal to a bulk delay for providing said received signal delayed by a selected amount of time;

filtering the delayed received signal to provide an approximation of the echo to be subtracted from the signal on the transmit line, providing by the subtraction an error signal; and automatically deriving said amount of time, in response to signals on the transmit and receive lines, and adaptively controlling the bulk delay to provide said selected amount of time delay, including detecting a condition when said received signal includes a relatively large signal value, with respect to a reference, preceded for a substantial time by a relatively small signal value, with respect to a reference, detecting when at a time elapsed from the occurrence of said relatively large received signal value, the signal on the transmit line includes a relatively large value, with respect to a reference, and repeatedly using said elapsed time to obtain a plurality of estimates of the selected amount of time delay for the bulk delay, and identifying the selected amount of time delay from said estimates.

2. The method of claim 1, wherein said identifying includes detecting one of said plurality of estimates which is most closely clustered with the others of said estimates.

3. A method of echo cancelling of the type which operates between a receive line and a transmit line at a near end of a long distance telephone circuit to process a signal received on the receive line in order to cancel an echo in a signal on the transmit line, comprising:

subjecting the received signal to a bulk delay for providing said received signal delayed by a selected amount of time;

adaptively filtering the delayed received signal to provide an approximation of the echo to be subtracted from the signal on the transmit line, providing by the subtraction an error signal, said filtering being performed with a transversal filter having a plurality of delay taps, each having a coefficient associated therewith;

automatically deriving said selected amount of time, in response to signals on the transmit and receive lines, and adaptively controlling the bulk delay to provide said selected amount of time delay, said deriving including controlling the bulk delay to provide various values of time delay, generating a measure of adaptation of the combination of the bulk delay and said filtering for each value of time delay, said measure tending to reach a peak value for values of time delay which are near an optimal value thereof, and said measure including a sum of numbers, each of which is a function of one of said coefficients, and determining said selected amount of time from the measures of adaptation corresponding to the various values of delay, including detecting when said measures approach a peak value.

4. The method of claim 3, wherein said sum of numbers includes a sum of absolute values of said coefficients.

5. The method of claim 3, wherein said sum of numbers includes the sum of squares of values of said coefficients.

6. The method of claim 3, wherein each of said measure includes a quotient, wherein a numerator includes the sum of absolute values of said coefficients associated with ones of said delay taps corresponding to a first period of delay, and the denominator includes a sum of absolute values of said coefficients associated with ones of said delay taps corresponding to a second later period of delay.

7. The method of claim 3, wherein each of said measure includes a quotient, wherein a numerator includes the sum of squares of values of said coefficients associated with ones of said delay taps corresponding to a first period of delay, and a denominator includes the sum of squares of values of coefficients associated with ones of said delay taps corresponding to a second, later period of delay.

8. A method of echo cancelling of the type which operates between a receive line and a transmit line at a near end of a long distance telephone circuit to process a signal received on the receive line in order to cancel an echo in a signal on the transmit line, comprising:

subjecting the received signal to a bulk delay for providing said received signal delayed by a selected amount of time;

adaptively filtering the delayed received signal to provide an approximation of the echo to be subtracted from the signal on the transmit line, providing by the subtraction an error signal, said filtering being performed with a transversal filter having a plurality of delay taps, each having a coefficient associated therewith;

automatically deriving said selected amount of time, in response to signals on the transmit and receive lines, and adaptively controlling the bulk delay to provide said selected amount of time delay, said deriving including controlling the bulk delay to provide various values of time delay, generating a measure of adaptation of the combination of the bulk delay and said filtering for each value of time delay, said measure tending to reach a peak value for values of time delay which are near an optimal value thereof, and said measure including an accumulation over time of values of a function of said received signal, and determining said selected amount of time from the measures of adaptation corresponding to the various values of delay, including detecting when said measures approach a peak value.

9. The method of claim 8, wherein said measure includes a quotient, the numerator thereof including an average of absolute values of samples of said received signal and the denominator including an average of absolute values of said error signal.

10. The method of claim 8, wherein said measure includes a quotient, the numerator thereof including an average of squares of the values of samples of said received signal and the numerator including an average of squares of said values of samples of said error signal.

11. A method of echo cancelling of the type which operates between a receive line and a transmit line at a near end of a long distance telephone circuit to process a signal received on the receive line in order to cancel an echo in a signal on the transmit line, comprising:

subjecting the received signal to a bulk delay for providing said received signal delayed by a selected amount of time;

adaptively filtering the delayed received signal to provide an approximation of the echo to be subtracted from the signal on the transmit line, providing by the subtraction an error signal, said filtering being performed with a transversal filter having a plurality of delay taps, each having a coefficient associated therewith;

automatically deriving said selected amount of time, in response to signals on the transmit and receive lines, and adaptively controlling the bulk delay to provide said selected amount of time delay, said deriving including controlling the bulk delay to provide various values of time delay, generating a measure of adaptation of the combination of the bulk delay and said filtering for each value of time delay, said measure tending to reach a peak value for values of time delay which are near an optimal value thereof, and said measure including an accumulation over time of values of a function of said approximation of the echo, and determining said selected amount of time from the measures of adaptation corresponding to the various values of delay, including detecting when said measures approach a peak value.

12. The method of claim 11, wherein said measure includes a quotient, the numerator thereof including an average of absolute values of said approximation of the echo and the denominator including an average of absolute values of said error signal.

13. The method of claim 11, wherein said measure includes a quotient, the numerator thereof including an average of squares of values of said approximation of the echo and the numerator including an average of squares of values of said error signal.

14. A method of echo cancelling of the type which operates between a receive line and a transmit line at a near end of a long distance telephone circuit to process a signal received on the receive line in order to cancel an echo in a signal on the transmit line, comprising:

subjecting the received signal to a bulk delay for providing said received signal delayed by a selected amount of time;

adaptively filtering the delayed received signal to provide an approximation of the echo to be subtracted from the signal on the transmit line, providing by the subtraction an error signal;

automatically deriving said selected amount of time, in response to signals on the transmit and receive lines, and adaptively controlling the bulk delay to provide said selected amount of time delay, said deriving including controlling the bulk delay to provide various values of time delay, estimating the opportunity of said filtering to adapt after the provision of a new one of said various values of time delay, including integrating a quantity approximately proportional to a rate of change of adaptation, of said filtering generating a measure of adaptation of the combination of the bulk delay and said filtering for each value of time delay, and determining said selected amount of time from the measures of adaptation corresponding to the various values of delay.

15. The method of claim 14, wherein said quantity integrated is a square of the value of the received signal.

16. The method of claim 14, wherein said quantity integrated is an absolute value of said received signal.

* * * * *